(12) United States Patent
Keller et al.

(10) Patent No.: US 7,658,906 B2
(45) Date of Patent: Feb. 9, 2010

(54) SULFUR RECOVERY PLANT

(75) Inventors: Alfred E. Keller, Ponca City, OK (US);
Nathan A. Hatcher, Buda, TX (US);
Sriram Ramani, Katy, TX (US); Larry D. Swinney, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 120 days.

(21) Appl. No.: 12/038,955

(22) Filed: Feb. 28, 2008

(65) Prior Publication Data

US 2009/0220402 A1   Sep. 3, 2009

(51) Int. Cl.
*B01J 12/00* (2006.01)
*B01J 12/02* (2006.01)
*C01B 17/04* (2006.01)

(52) U.S. Cl. ............... 423/573.1; 423/576.8; 422/168; 422/169; 422/170; 422/171; 422/177; 422/180

(58) Field of Classification Search ............. 423/573.1, 423/576.8; 422/168–171, 177, 180
See application file for complete search history.

(56) References Cited

U.S. PATENT DOCUMENTS

| 2,767,062 | A |   | 10/1956 | Duecker |   |
|---|---|---|---|---|---|
| 3,617,221 | A | * | 11/1971 | Egan et al. | 423/574.1 |
| 4,822,591 | A |   | 4/1989 | Reed et al. |   |
| 4,908,201 | A |   | 3/1990 | Cabanaw |   |
| 5,015,460 | A |   | 5/1991 | Pendergraft |   |
| 7,172,746 | B1 | * | 2/2007 | Rischard | 423/573.1 |
| 7,250,149 | B1 | * | 7/2007 | Smith | 423/573.1 |
| 7,357,908 | B2 | * | 4/2008 | Ramani et al. | 423/574.1 |
| 2008/0050306 | A1 |   | 2/2008 | Keller et al. |   |

* cited by examiner

Primary Examiner—Timothy C Vanoy

(57) ABSTRACT

Novel sulfur recovery plants, and processes utilizing these plants are disclosed. These apparatuses eliminate the use of a condenser between the waste heat boiler and first Claus catalytic reactors, and also eliminate the use of reheaters in between Claus catalytic reactors.

14 Claims, 2 Drawing Sheets

SULFUR RECOVERY PLANT

FIELD OF THE INVENTION

The present invention generally relates to methods and apparatus for recovering elemental sulfur from hydrogen sulfide-containing gas streams, and more particularly to such methods and apparatus that reduce the size and complexity of existing Claus plants.

BACKGROUND OF THE INVENTION

Large quantities of $H_2S$-containing gases are commonly produced in the natural gas and petroleum industry and concentrated by amine treating units and sour water stripping units. Claus sulfur recovery plants ("Claus plants") are in widespread use to convert this environmentally hazardous $H_2S$ to useful elemental sulfur by oxidation according to the overall or net equation $$H_2S + \tfrac{1}{2}O_2 \rightarrow 1/xS_x + H_2O \tag{1}$$

wherein x=2, 6 or 8, depending on the particular conditions of temperature and pressure. The net production of elemental sulfur is usually accomplished as a series of process steps carried out according to a conventional plant flow scheme. A conventional Claus unit comprises a free flame combustion/reaction furnace stage and a catalytic stage.

The free flame combustion step takes place by burning ⅓ of the $H_2S$ in burner according to the equation:

$$H_2S + \tfrac{3}{2}O_2 \rightarrow SO_2 + H_2O \tag{2}$$

Oxygen for the combustion stage is usually supplied by air from an air compressor or blower. The combustion stage is followed by the stages in which the "Claus reaction" takes place according to the equation $$2H_2S + SO_2 \leftrightarrow 3/xS_x + 2H_2O \tag{3}$$

wherein x=2, 6 or 8, depending on the particular conditions of temperature and pressure.

The Claus reaction initially takes place in the reaction furnace immediately following the burner, and while the gases are at near-flame temperatures. After the gases exit the reaction furnace they are cooled in a waste heat boiler (WHB), usually with boiling water circulating in the waste heat boiler and being converted to medium to high-pressure steam. After cooling, the gases are cooled further in a sulfur condenser, in which boiling water is circulated to make low pressure steam. At this stage in the process about 50-70% of the incoming $H_2S$ will typically have been converted to elemental sulfur. The actual amount depends on such factors as inlet $H_2S$ concentration, flame temperature, residence time in the reaction furnace following the burner, and the presence and amount of other chemicals such as other combustibles or carbon dioxide. Condensed liquid sulfur product is usually recovered at this point in the process.

A 70% level of conversion is insufficient by today's standards to allow the effluent from the Claus furnace to be emitted to the atmosphere or to make tail gas treatment economical at this point. An increase in the overall level of conversion is usually achieved by removing one of the reaction products from the mixture (e.g., by condensing and removing liquid elemental sulfur), and then allowing the remaining gases to continue reacting until equilibrium is reached (Equation 3). After the reaction furnace, the reacted gases are cooled in a WHB against boiling water. The gases can be cooled to allow condensation of sulfur in this WHB, or, more typically, the cooled gases from the WHB are further cooled in a separate sulfur condenser to facilitate condensation of the sulfur formed in the first reaction stage.

In modified Claus plants, further recovery of sulfur is accomplished by taking the gases from the first condenser, reheating, and then passing the gases over a high surface area Claus catalyst in a packed bed reactor. The Claus reaction (Equation 3) takes place on the catalyst up to the equilibrium limit of the reaction. Some well-known Claus catalysts are bauxite, alumina and titania. The Claus catalytic reactors are normally operated in the gas phase to prevent condensed sulfur from plugging the pores of the catalyst. To enhance recovery of sulfur via the Claus reaction, the elemental sulfur is conventionally removed by condensation in a sulfur condenser which follows the catalytic reactor. Similar reheat, reaction and condensation steps are commonly repeated two to three times in order to maximize sulfur yield of the plant. Because of the equilibrium restraints inherent in the Claus reaction (Equation 3), adding more catalytic Claus reactors becomes ineffective beyond a total of three or four units, so other measures must be taken in order to further increase sulfur recovery beyond about 98 vol. % of the initial $H_2S$ and to complete the recovery of the remaining sulfur before the effluent is released to the atmosphere.

The addition of equipment needed to improve recovery almost invariably decreases the capacity of the plant by adding resistance to flow from additional friction. Thus the addition of each reheater, catalytic Claus reactor, sulfur condenser and tail gas treatment unit is accompanied by a reduction in operating pressure. Moreover, as demand for sulfur recovery capacity grows in an existing facility, the flows of $O_2$-containing gas and $H_2S$-containing gas into the Claus plant will increase. This increase in flow causes an increase in pressure drop through the system approximated by the relationship $$DP_2/DP_1 = (Q_2/Q_1)^2 \tag{4}$$

where DP is pressure drop, Q is volumetric flow rate, 1 is the initial flow condition, and 2 is the new flow condition. In any given system, at a certain flow rate of $H_2S$-containing gas the pressure drop due to friction from flow will exceed the available pressure drop through the unit. At that point, the unit is capacity constrained. Conventional Claus plants operate at low pressure, usually 20-30 psia at the front of the plant. In almost every case, a conventional sulfur recovery plant with a burner, reaction furnace, multiple reheat, catalytic Claus reactor, and condenser stages, and single tail gas treatment unit is limited to 5 to 15 psi of available pressure drop. Many existing Claus plants suffer from a severe constraint in capacity.

Following LeChatelier's principle, the flame and reaction furnace section of the furnace should be operated at the highest temperature possible to drive the equilibrium conversion of sulfur. This temperature is usually regulated by the incoming reactant temperatures, by the concentration of $H_2S$ and other combustible gases, such as light hydrocarbons, and the presence of inerts in either the $H_2S$-containing gas or in the air. It is assumed in Claus design that as the reaction mixture cools in the waste heat boiler following the reaction furnace, the mixture will be at or near equilibrium and the mixture will retain this composition by the rapid cooling in the waste heat boiler "quenching" the reaction.

Another assumption is that the formation of sulfur in the reaction furnace/waste heat boiler will inhibit the formation of sulfur in subsequent catalytic stages according to LeChatelier's principle; that is, sulfur is a reaction product, so having sulfur in this stream will shift the reaction equilibrium the wrong direction if kept in the process stream. Therefore, the waste heat boiler is normally built with extra heat transfer capability to condense the bulk of the sulfur vapor formed, or a sulfur condenser after the waste heat exchanger is added. It is also typical to reduce the temperature of the gases from the condenser to get the maximum amount of sulfur out of the gas stream before proceeding to the next conversion stage. Simplification of the Claus process by removing pieces of equipment in the apparatus and process flow can be beneficial by reducing the cost of equipment and by decreasing the frictional resistance to flow thereby increasing unit capacity.

SUMMARY OF THE INVENTION

In one embodiment of the present invention, a sulfur recovery plant consists of or consists essentially of: a) a burner; b) a reaction furnace; c) a waste heat boiler; d) a series of reactors in fluid flow communication with the waste heat boiler wherein there is a condenser in between each reactor and after the final reactor in the series of reactors; and e) a tail gas treatment zone.

In another embodiment of the present invention, a sulfur recovery plant comprises, consists of, or consists essentially of: a) a burner; b) a reaction furnace; c) a waste heat boiler; d) a first reactor in fluid flow communication with the waste heat boiler and a series of subsequent reactors in fluid flow communication with the first reactor, wherein the series of subsequent reactors includes a final reactor, and wherein there is not a condenser between the waste heat boiler and the first reactor, and wherein a condenser precedes each reactor in the series of subsequent reactors, and there are no reheaters in between each condenser and reactor in each reactor in the subsequent series of reactors; and e) a final condenser between the final reactor and a tail gas treatment zone.

In yet another embodiment of the present invention, a process for recovering elemental sulfur from a gas stream comprising hydrogen sulfide consists of or consists essentially of: a) passing a gas stream comprising hydrogen sulfide and an $O_2$-containing gas through a burner, a reaction furnace and a waste heat boiler to yield a process gas stream comprising elemental sulfur, water, $SO_2$, and any unreacted hydrogen sulfide; b) passing the process gas stream through a series of reactors in fluid flow communication with the waste heat boiler wherein the process gas stream passes through a condenser in between each reactor; c) passing the process gas stream through a final condenser after the last reactor in the series; and d) passing the process gas stream through a tail gas treatment zone.

In yet another embodiment of the present invention, a process for recovering elemental sulfur from a gas stream comprising hydrogen sulfide, comprises, consists of, or consists essentially of: a) passing the gas stream through a burner, a reaction furnace and a waste heat boiler to yield a process gas stream comprising elemental sulfur, water, $SO_2$, and any unreacted hydrogen sulfide; b) passing the process gas stream through a first reactor in fluid flow communication with the waste heat boiler wherein the process gas stream does not first pass through a condenser after leaving the waste heat boiler and before arriving at said first reactor; c) passing the process gas stream through a series of subsequent reactors in fluid flow communication with the first reactor, wherein the process gas stream passes through a condenser before passing through each reactor in the series of subsequent reactors, and wherein the process stream does not pass through a reheater in between each condenser and reactor in each of the series of subsequent reactors; d) passing the process gas stream through a final condenser after the last reactor in the series; and e) passing said process gas stream to a tail gas treatment zone.

DETAILED DESCRIPTION OF THE INVENTION

Figure 1:
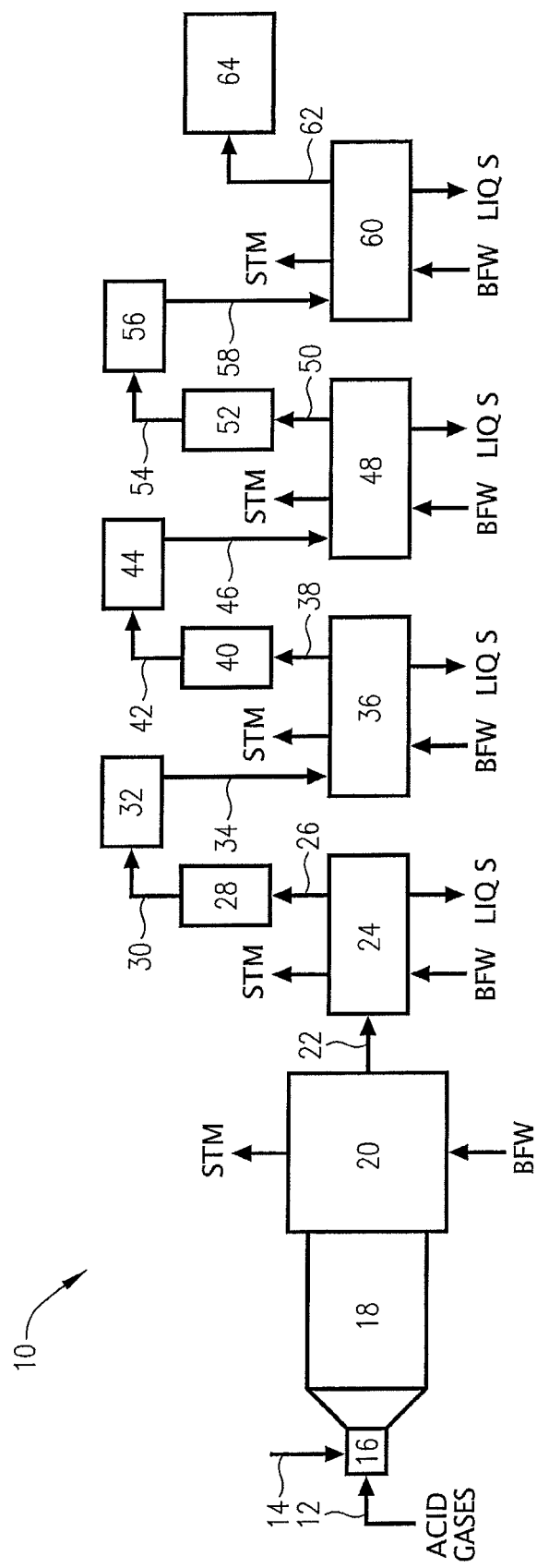
FIG. 1 is a schematic drawing of a conventional Claus sulfur recovery plant.

As shown in FIG. 1, a Claus sulfur recovery plant 10 comprises a conventional burner 16 and reaction furnace 18 followed by a high temperature waste heat boiler (WHB) 20. A stream comprising of either an acid gas (generally comprising of $H_2S$ and $CO_2$), or an acid gas and a sour water stripper gas ('SWS gas') (generally comprising of water vapor, $H_2S$ and $NH_3$) enters burner 16 via conduit 12. Air for the combustion reaction taking place in burner 16 is supplied to it from an air compressor or blower via conduit 14. Steam pressure in WHB 20 is generally in the range of from about 50 psig to about 600 psig. The temperature of WHB 20 is generally in the range of from about 500° F. to about 800° F.

The stream exits WHB 20 via process gas outlet 22 and passes to first sulfur condenser 24. First sulfur condenser 24 (along with sulfur condensers 36, 48, and 60) has an outlet for steam (shown as 'STM' in the figure), an inlet for boiler feed water (shown as 'BFW' in the figure), and an outlet for liquid sulfur (shown as 'Liq S' in the figure). Steam pressure in sulfur condenser 24 (and also in sulfur condensers 36 and 48) is typically in the range of from about 40 to about 60 psig. The process gas that emerges from first sulfur condenser 24 passes to heater 28 for pre-heating via conduit 26 prior to entering a first Claus catalytic reactor 32 via conduit 30. The temperature of conduit 30 can be adjusted between about 500° F. to about 550° F. to allow first Claus catalytic reactor 32 to attain temperatures above about 600° F. for COS and $CS_2$, which are byproducts from burner/reaction furnace 16 and 18, to be converted to $H_2S$. Optionally, conduit 30 can be operated as cool as possible, generally from about 400° F. to about 450° F. to get maximum conversion in first Claus catalytic reactor 32, following LeChatelier's principle (lower temperatures increase conversion). In this case, conduit 34 is kept at least 30° F. above the sulfur dew point by adjusting the temperature of conduit 30.

First Claus catalytic reactor 32 is followed by the second conventional sulfur condenser 36, which the feed enters via conduit 34. Heater 40 (via conduit 38) follows second condenser 36 and precedes second Claus catalytic reactor 44 (via conduit 42). Conduit 42 is typically heated at a temperature range from about 390° F. to about 450° F., depending on the sulfur dew point of conduit 46.

After reactor 44, the feed passes into third sulfur condenser 48 via conduit 46, followed by heater 52, in which the feed enters via conduit 50. Heater 52 precedes a third Claus catalytic reactor 56 via conduit 54. Conduit 54 is typically heated at a temperature range from about 375° F. to about 425° F. depending on the sulfur dew point of conduit 46.

Following reactor 56 is fourth sulfur condenser 60, which the feed enters via conduit 58. The feed then enters a tail gas treatment zone or an incinerator 64 via conduit 62 for further treatment. Fourth sulfur condenser 60 can be operated in the same manner as condensers 24, 36, and 48, but it can also have lower pressure steam or heat pressurized water in order to keep the stream temperature leaving condenser 60 and passing through conduit 62 in the range of from about 250° F. to about 275° F. This reduces elemental sulfur passing to tail gas treatment zone 64. Generally, the surface area of tubes located in condensers 24, 36, 48, and 60 is designed to get the stream as cool as possible to take the maximum amount of sulfur vapor out of the streams leaving the condenser.

Figure 2:
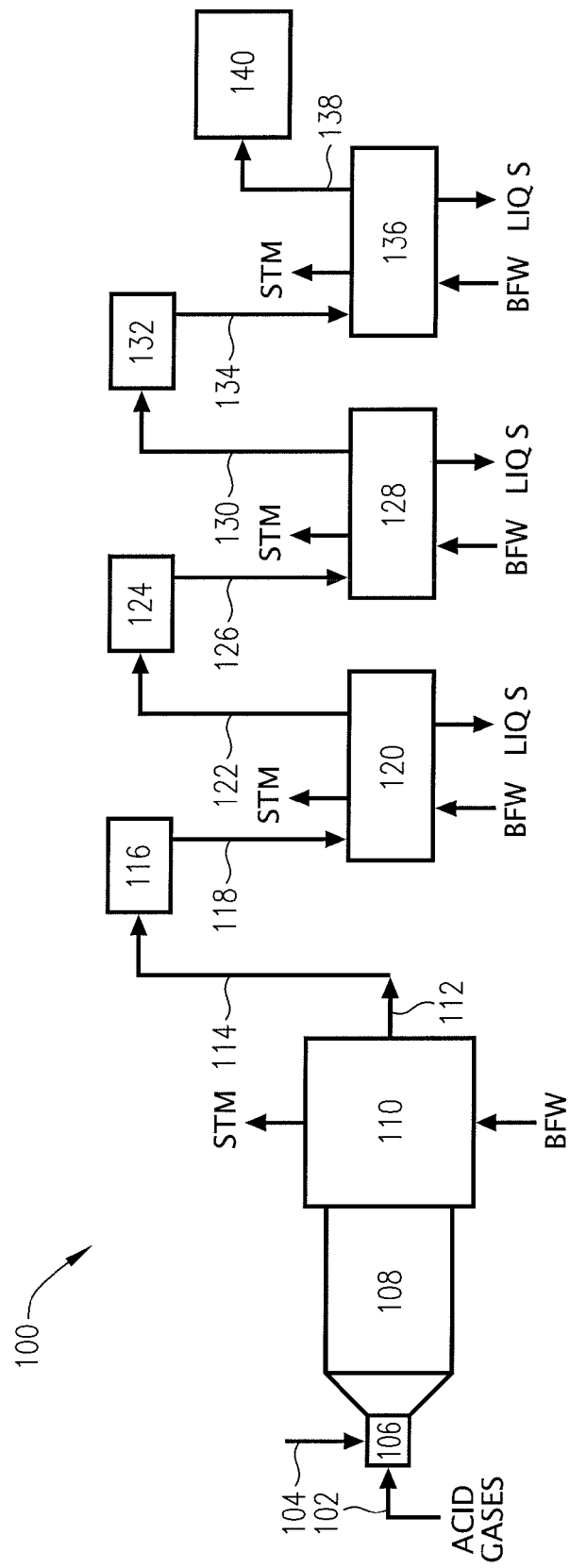
FIG. 2 is a schematic drawing of a Claus sulfur recovery plant in accordance with an embodiment of the present invention.

As shown in FIG. 2, a modified Claus sulfur recovery plant 100 comprises a reaction furnace 108 followed by WHB 110. A feed enters burner 106 via conduit 102. Air is supplied via conduit 104. The thermal stage of the Claus process in FIG. 2 operates in generally the same manner as the thermal stage in FIG. 1. The surface area of WHB 110 is designed and steam pressure range is selected to keep the temperature of conduit 114 above the dew point of sulfur and below about 600° F. The actual operating temperature of conduit 114 is chosen to get maximum conversion in first Claus catalytic reactor 116 without going below the dew point of sulfur anywhere in the reactor. Optionally, the steam pressure in WHB 110 can be adjusted to compensate for changes in flow or amount of heat released in burner/reaction furnace 106/108 to keep the temperature in conduit 114 from going below the sulfur dew point or from getting above 600° F. While not wishing to be bound by theory, it is believed that the effect on not condensing the sulfur in WHB 110 or in a condenser after WHB 110 is minimal on overall unit efficiency. The equilibrium position of the reaction is determined by the reactants and their starting temperature, pressure, and composition and the final temperature and pressure of first Claus catalytic reactor 116. By allowing the process gas stream to pass from WHB 110 to first Claus catalytic reactor 116, the reaction can be continued to the higher conversion at a lower temperature without removal of any of the product elemental sulfur from reaction furnace 108.

The feed exits WHB 110 via process gas outlet 112 and, instead of passing to a condenser, passes to first Claus catalytic reactor 116 via conduit 114. The process gas that emerges from first Claus catalytic reactor 116 passes to first sulfur condenser 120 via conduit 118. First sulfur condenser 120 (along with sulfur condensers 128 and 136) has an outlet for steam and liquid sulfur, along with an inlet for BFW, as the condensers in FIG. 1. The surface area of condensers 120 and 128 is designed and the steam pressure range is selected to keep the temperatures of conduits 122 and 130 high enough to keep conduits 126 and 134, respectively, above the dew point of sulfur. The temperature range of conduits 122 and 130 is typically from about 390° F. to about 450° F. The steam pressure range in condensers 120 and 128 is generally in the range of from about 22 psig to about 65 psig, depending on the temperatures of conduits 122 and 130, on the final disposition of the steam generated, and on the flow rates of conduits 102 and 104.

The feed passes into second Claus catalytic reactor 124 via conduit 122. After reactor 124, the feed passes into second sulfur condenser 124 via conduit 126. The feed then enters third Claus catalytic reactor 132 via conduit 130. Following reactor 132 is third sulfur condenser 136, which the feed enters via conduit 134. Third sulfur condenser 136 operates in generally the same manner as condenser 60 in FIG. 1, above. The feed then enters a tail gas treatment zone or an incinerator 140 via conduit 138 for further treatment.

EXAMPLES

The following examples are intended to be illustrative of the present invention and to teach one of ordinary skill in the art to make and use the invention. These examples are not intended to limit the invention in any way.

Example 1

Conventional Claus Unit

A computer model was used to simulate a sulfur recovery process in a conventional Claus unit. Two feed streams were used—an amine acid gas and a SWS acid gas. These feed compositions, temperatures and pressures are found in Table 1, below.

TABLE 1

Feeds Used in Simulation

| Feed | Composition | Temperature | Pressure |
|---|---|---|---|
| Acid Gas | 93.47 mol. % $H_2S$, 6.02 mol. % $CO_2$ | 110° F. | 26.7 psia |
| SWS Gas | 44.75 mol. % $H_2S$, 55.25 mol. % $NH_3$ | 180° F. | 26.7 psia |

The feeds passed through the following components of a Claus unit in this order: an acid gas mixer, an acid gas preheater, a SWS gas preheater, an acid gas/SWS gas mixer, an air combuster, a reaction furnace, a waste heat boiler, a first condenser, a first reheater, a first reactor, a second condenser, a second reheater, a second reactor, a third condenser, a third reheater, a third reactor, and a fourth condenser. The total sulfur recovery was 97.1%. Operating parameters are shown in Table 2, below.

TABLE 2

Operating Parameters for Example 1

| Component | Temperature, ° F. | Pressure, psia |
|---|---|---|
| Waste Heat Boiler Inlet | 2442.6 | 24.4 |
| Waste Heat Boiler Gas Outlet | 600.0 | 24.1 |
| Waste Heat Boiler Liquid Outlet | 600.0 | 24.1 |
| First Condenser Inlet | 600.0 | 24.1 |
| First Condenser Vapor Outlet | 350.0 | 23.6 |
| First Condenser Liquid Outlet | 350.0 | 23.6 |
| Second Condenser Inlet | 589.4 | 22.7 |
| Second Condenser Vapor Outlet | 340.0 | 22.2 |
| Second Condenser Liquid Outlet | 340.0 | 22.2 |
| Third Condenser Inlet | 458.1 | 21.3 |
| Third Condenser Vapor Outlet | 330.0 | 20.8 |
| Third Condenser Liquid Outlet | 330.0 | 20.8 |
| Fourth Condenser Inlet | 408.0 | 19.9 |
| Fourth Condenser Vapor Outlet | 270.0 | 19.4 |
| Fourth Condenser Liquid Outlet | 270.0 | 19.4 |

Example 2

Inventive

A computer model was used to simulate a sulfur recovery process in a manner consistent with at least one embodiment of the present invention. Two feed streams were used—an acid gas and a SWS acid gas. These feed compositions, temperatures, and pressures were identical to those used in Example 1. Operating parameters of Example 2 are shown in Table 3, below.

TABLE 3

Operating Parameters of Example 2

| Component | Temperature, ° F. | Pressure, psia |
|---|---|---|
| Waste Heat Boiler Inlet | 2442.5 | 24.4 |
| Waste Heat Boiler Gas Outlet | 560.0 | 24.1 |
| First Condenser Inlet | 662.4 | 23.5 |
| First Condenser Vapor Outlet | 400.0 | 23.0 |
| First Condenser Liquid Outlet | 400.0 (Simulated) 275-310 Expected | 23.0 |
| Second Condenser Inlet | 473.1 | 22.4 |

TABLE 3-continued

Operating Parameters of Example 2

| Component | Temperature, ° F. | Pressure, psia |
|---|---|---|
| Second Condenser Vapor Outlet | 410.0 | 21.9 |
| Second Condenser Liquid Outlet | 410.0 (Simulated) 275-310 Expected | 21.9 |
| Third Condenser Inlet | 419.3 | 21.3 |
| Third Condenser Vapor Outlet | 270.0 | 20.8 |
| Third Condenser Liquid Outlet | 270.0 | 20.8 |

The feeds passed through the same unit of Example 1, with the exclusion of four components. The components excluded were: the condenser following the waste heat boiler and the first, second, and third reheaters. The first condenser in Table 3 above is located after the first catalytic reactor, not right after the waste heat boiler as in Example 1. The total sulfur recovery was 96.6%.

Therefore, the removal of these four pieces of equipment had little to no effect on the total sulfur recovery.

That which is claimed is:

1. A sulfur recovery plant comprising:
   a) a burner;
   b) a reaction furnace;
   c) a waste heat boiler;
   d) a first reactor in fluid flow communication with said waste heat boiler and a series of subsequent reactors in fluid flow communication with said first reactor, wherein said series of subsequent reactors includes a final reactor, and wherein there is not a condenser between said waste heat boiler and said first reactor, and wherein a condenser precedes each reactor in said series of subsequent reactors, and there are no reheaters in between each condenser and reactor in each said subsequent series of reactors; and
   e) a final condenser between the final reactor and a tail gas treatment zone.

2. A sulfur recovery plant in accordance with claim 1, wherein said waste heat boiler has a surface area designed in a manner so as to keep a stream entering said first reactor at a temperature in the range of from about the dew point of sulfur to about 600° F.

3. A sulfur recovery plant in accordance with claim 1, wherein said waste heat boiler has a steam pressure so as to keep a stream entering said first reactor at a temperature in the range of from about the dew point of sulfur to about 600° F.

4. A sulfur recovery plant in accordance with claim 1, wherein each condenser preceding a reactor in said series of subsequent reactors has a steam pressure so as to keep a stream entering each reactor in said series of subsequent reactors at a temperature in the range of from about 390° F. to about 450° F.

5. A sulfur recovery plant in accordance with claim 4, wherein said steam pressure in each condenser preceding a reactor in said series of subsequent reactors is in the range of from about 22 psig to about 65 psig.

6. A sulfur recovery plant in accordance with claim 1 wherein each condenser preceding a reactor in said series of subsequent reactors has a surface area designed so as to keep a stream entering each reactor in said series of subsequent reactors at a temperature in the range of from about 390° F. to about 450° F.

7. A sulfur recovery plant consisting essentially of:
   a) a burner;
   b) a reaction furnace;
   c) a waste heat boiler;
   d) a series of reactors in fluid flow communication with said waste heat boiler wherein there is a condenser in between each reactor and after the final reactor in said series of reactors and
   e) a tail gas treatment zone.

8. A process for recovering elemental sulfur from a gas stream comprising hydrogen sulfide, said process comprising:
   a) passing said gas stream through a burner, a reaction furnace and a waste heat boiler to yield a process gas stream comprising elemental sulfur, water, $SO_2$, and any unreacted hydrogen sulfide;
   b) passing said process gas stream through a first reactor in fluid flow communication in said waste heat boiler wherein said process gas stream does not first pass through a condenser after leaving said waste heat boiler and before arriving at said first reactor;
   c) passing said process gas stream through a series of subsequent reactors in fluid flow communication with said first reactor, wherein said process gas stream passes through a condenser before passing through each reactor in said series of subsequent reactors, and wherein said process stream does not pass through a reheater in between each condenser and reactor in each of said series of subsequent reactors; and
   d) passing said process gas stream to a final condenser; and
   e) passing said process gas stream to a tail gas treatment zone.

9. A process in accordance with claim 8, wherein said waste heat boiler has a surface area designed in a manner so as to keep a stream entering said first reactor at a temperature in the range of from about the dew point of sulfur to about 600° F.

10. A process in accordance with claim 8, wherein said waste heat boiler has a steam pressure so as to keep said gas stream entering said first reactor at a temperature in the range of from about the dew point of sulfur to about 600° F.

11. A process in accordance with claim 8, wherein each condenser preceding a reactor in said series of subsequent reactors has a steam pressure so as to keep a stream entering each reactor in said series of subsequent reactors at a temperature in the range of from about 390° F. to about 450° F.

12. A process in accordance with claim 11, wherein said steam pressure in each condenser preceding a reactor in said series of subsequent reactors is in the range of from about 22 psig to about 65 psig.

13. A process in accordance with claim 8, wherein each condenser preceding a reactor in said series of subsequent reactors has a surface area designed so as to keep a stream entering each reactor in said series of subsequent reactors at a temperature in the range of from about 390° F. to about 450° F.

14. A process for recovering elemental sulfur from a gas stream comprising hydrogen sulfide, said process consisting essentially of:
   a) passing a gas stream comprising hydrogen sulfide and an $O_2$-containing gas through a burner, a reaction furnace and a waste heat boiler to yield a process gas stream comprising elemental sulfur, water, $SO_2$, and any unreacted hydrogen sulfide;
   b) passing said process gas stream through a series of reactors in fluid flow communication with said waste heat boiler wherein said process gas stream passes through a condenser in between each reactor;
   c) passing said process gas stream through a final condenser after the last reactor in said series; and
   c) passing said process gas stream through a tail gas treatment zone.

* * * * *